(12) United States Patent
Chen et al.

(10) Patent No.: US 11,671,987 B2
(45) Date of Patent: Jun. 6, 2023

(54) PARAMETER TRANSMISSION METHOD AND APPARATUS, AND STORAGE MEDIUM

(71) Applicant: ZTE Corporation, Shenzhen (CN)

(72) Inventors: Yijian Chen, Shenzhen (CN); Yu Ngok Li, Shenzhen (CN); Zhaohua Lu, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/505,746

(22) Filed: Oct. 20, 2021

(65) Prior Publication Data

US 2022/0046614 A1 Feb. 10, 2022

Related U.S. Application Data

(63) Continuation of application No. 16/610,679, filed as application No. PCT/CN2018/091622 on Jun. 15, 2018, now Pat. No. 11,178,652.

(30) Foreign Application Priority Data

May 5, 2017 (CN) .......................... 201710313849.8

(51) Int. Cl.
*H04W 72/04* (2023.01)
*H04W 72/23* (2023.01)
(Continued)

(52) U.S. Cl.
CPC ........... *H04W 72/23* (2023.01); *H04L 1/0023* (2013.01); *H04L 5/0053* (2013.01)

(58) Field of Classification Search
CPC ............. H04W 72/14; H04W 72/1273; H04W 72/082; H04W 24/10; H04B 7/024;
(Continued)

(56) References Cited

U.S. PATENT DOCUMENTS

2010/0074207 A1* 3/2010 Pan ...................... H04B 7/0665
375/267
2015/0195069 A1* 7/2015 Yi .......................... H04L 5/0053
370/329
(Continued)

FOREIGN PATENT DOCUMENTS

CN    102595514 A    7/2012
CN    104185197 A    12/2014
(Continued)

OTHER PUBLICATIONS

Chinese Office Action for corresponding application 2017103138498; dated Oct. 22, 2021.
(Continued)

*Primary Examiner* — Jung Liu
(74) *Attorney, Agent, or Firm* — Cantor Colburn LLP (57) ABSTRACT

Disclosed are a parameter transmission method and apparatus, and a non-transitory computer-readable storage medium. The transmission parameter method includes: sending, by a sending end, control information carrying a value of at least one transmission parameter in at least one transmission parameter set; wherein the control information adopts a value of a transmission parameter for a slot or a link on which the control information acts.

15 Claims, 4 Drawing Sheets

(51) Int. Cl.
*H04L 1/00* (2006.01)
*H04L 5/00* (2006.01)

(58) Field of Classification Search
CPC .. H04B 7/0417; H04B 7/0626; H04B 7/0639; H04B 17/318; H04B 7/0456; H04B 7/0621; H04B 17/345; H04L 5/0035; H04L 5/001; H04L 5/0094; H04L 5/0053; H04L 5/0057; H04L 5/0048; H04L 5/006; H04L 1/06; H04L 1/0026; H04L 5/0051; H04L 25/021; H04L 5/0073; H04L 5/0058

See application file for complete search history.

(56) References Cited

U.S. PATENT DOCUMENTS

| | | | | |
|---|---|---|---|---|
| 2016/0173250 | A1* | 6/2016 | Kang | H04B 7/0626 370/329 |
| 2016/0353474 | A1* | 12/2016 | Zhang | H04L 1/1887 |
| 2016/0366003 | A1* | 12/2016 | Kwon | H04L 27/3405 |
| 2017/0338878 | A1* | 11/2017 | Gao | H04B 17/318 |
| 2018/0102821 | A1* | 4/2018 | Manolakos | H04L 5/0023 |
| 2019/0150187 | A1* | 5/2019 | Park | H04W 72/14 370/330 |

FOREIGN PATENT DOCUMENTS

| | | |
|---|---|---|
| CN | 105338637 A | 2/2016 |
| CN | 105680999 A | 6/2016 |
| CN | 106559232 A | 4/2017 |
| CN | 106559897 A | 4/2017 |
| CN | 108092740 A | 5/2018 |
| WO | 2014180188 A1 | 11/2014 |

OTHER PUBLICATIONS

Chinese Search Report for corresponding application 2017103138498; dated Oct. 15, 2021.

International Search Report for corresponding application PCT/CN2018/091622 filed Jun. 15, 2018; dated Sep. 10, 2018.

* cited by examiner

A sending end classifies M transmission parameters to be sent on a physical layer into K transmission parameter sets, and notifies a receiving end of classification indication information of the M transmission parameters; or the sending end agrees with the receiving end on a classification manner of the M transmission parameters, and classifies the M transmission parameters in the agreed classification manner — 301

The sending end determines the number of values of the transmission parameters in the K transmission parameter sets, and notifies the receiving end of value indication information of at least one transmission parameter in at least one transmission parameter set; or the sending end agrees with the receiving end on a determination manner of the number of values of the transmission parameter in the at least one transmission parameter set, and determines the number of values of the transmission parameter in the at least one transmission parameter set in the agreed determination manner — 302

The sending end sends a value of the transmission parameter in the at least one transmission parameter set via DCI — 303

FIG. 3

| DCI part A, value 1 | DCI part B, value 1 |
| | DCI part B, value 2 |
| | ... |
| | DCI part B, value n₂ |

FIG. 4(a)

| DCI part A, value 1 | DCI part B, value 1 | DCI part G, value 1 |
| | DCI part B, value 2 | DCI part G, value 2 |
| | ... | ... |
| | DCI part B, value n₂ | DCI part G, value n₃ |

PARAMETER TRANSMISSION METHOD AND APPARATUS, AND STORAGE MEDIUM

CROSS-REFERENCES TO RELATED APPLICATIONS

The present application claims benefit of priority to U.S. non-Provisional application Ser. No. 16/610,679 titled "TRANSMISSION PARAMETER CONFIGURATION METHOD AND APPARATUS, AND DETERMINATION METHOD AND APPARATUS" and filed on Nov. 4, 2019, which is the U.S. National Stage of International Patent Application Number PCT/CN2018/091622 filed on Jun. 15, 2018, which claims priority to Chinese Patent Application Number 201710313849.8 filed on May 5, 2017, all of which said applications are hereby incorporated by reference in their entirety.

TECHNICAL FIELD

The present disclosure relates to the field of communications and, for example, to a parameter transmission method and apparatus, and a storage medium.

BACKGROUND

In the fifth generation (5G) New Radio (NR), Dual-connection (DC) and Slot Aggregation (SA) both are important technologies to support. The former can improve robustness and transmission efficiency, and the latter can reduce control signaling overhead.

Figure 1:
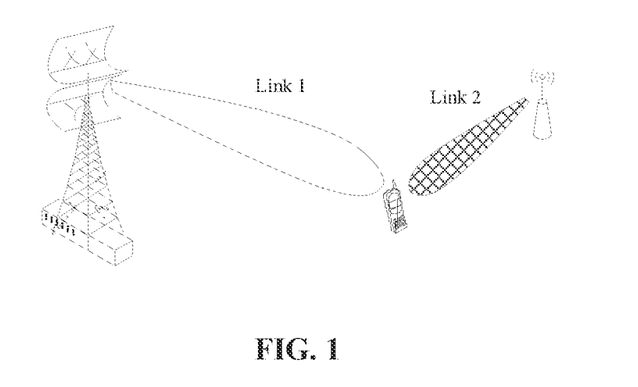
FIG. 1 is a schematic diagram of typical downlink DC.

The DC refers to that multiple links exist between nodes for communication. The DC, according to different protocol stacks, can be divided into L1 DC, L2DC and L3 DC. The L1 generally refers to a Physical Layer (PHY Layer), the L2 generally refers to a Medium Access Control Layer (MAC Layer), and the L3 refers to a higher layer, such as a Radio Resource Control Layer (RRC Layer). The advantage of the DC is that, in one aspect multiple links can be used to transmit the same information to improve the robustness, and in another aspect, different content can be transmitted to improve throughput. The link herein includes an uplink link and a downlink link as well as a backhaul link. FIG. 1 is a schematic diagram of typical downlink DC. The DC can also be extended to that the same node has relatively independent multiple antenna panels and that the same panel has multiple transceiver units (TXRUs) with different radio frequency (RF) directions. For example, a base station 1 and a panel or a TXRU 1 of a user equipment (UE) constitute a Link 1, and a base station 2 and the panel or a TXRU 2 of the UE constitute a Link 2; or a base station 1 and a panel or a TXRU 1 of a UE constitute a Link 1, and the base station 1 and the panel or a TXRU 2 of the UE constitute a Link 2; or a base station 1 and a panel or a TXRU 1 of a UE constitute a Link 1, and a base station 2 and the panel or a TXRU 2 of the UE constitute a Link 2.

During the DC, if some parameters related to transmission need to be configured for different links, configuration signaling adopted by the different links are independent in the related art. Although the related art is highly flexible, the following drawbacks still exist: first, signaling overhead is large, especially for the PYH layer, since downlink control information (DCI) is frequently transmitted, DCI signaling occupies large overhead, which will seriously affect transmission efficiency and robustness; and second, completely independent transmission parameter configuration is not compatible for part of receiving ends. For example, a waveform used by a link 1 is different from a waveform used by a link 2, but part of receiving ends cannot support different links to use different waveforms; and other transmission parameters (e.g., rate matching, a precoder matrix indicator (PMI), a power indication) can also cause incompatibility, thereby affecting transmission performance.

Figure 2:
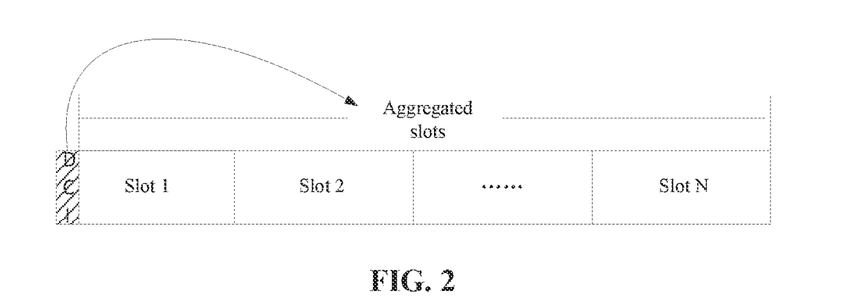
FIG. 2 is a schematic diagram of sending of control signaling during slot aggregation in the related art.

The SA is a manner of jointly scheduling multiple time domain resources. This manner can jointly schedule N slots, and jointly configure parameters related to transmission for these N slots, which can reduce control overhead. As shown in FIG. 2, control singling can be sent on a first slot. Generally, transmission parameters on each slot are the same, and if the transmission parameters are different, the transmission parameters need to be pre-agreed.

Although the related art of the SA has small overhead, its flexibility is very poor, which may cause the reduction of the transmission efficiency. For example, in a subsequent slot, there is a possibility of different Multi-user Multiple-Input Multiple-Output (MU-MIMO) pairings, and there are demands to change the number of multiplexed layers, power, pilot port allocation, transmission technology and other parameters on a slot i and a slot j.

It can be seen that, due to low configuration efficiency and poor compatibility of parameters related to transmission during the DC, configuration efficiency of the control signaling is low or flexibility of the control signaling is poor during the SA.

SUMMARY

The following is a summary of the subject matter described herein in detail. This summary is not intended to limit the scope of the claims.

Embodiments of the present application provide a parameter transmission method and apparatus, and a storage medium, so as to flexibly configure transmission parameters, save signaling overhead and improve compatibility.

The embodiments of the present application provide a parameter transmission method. The method includes steps described below.

A sending end send control information carrying a value of at least one transmission parameter in at least one transmission parameter set, where the control information adopts a value of a transmission parameter for a slot or a link on which the control information acts.

The embodiments of the present application further provide a parameter transmission apparatus. The apparatus includes a processor and a memory storing program instructions. The processor executes the program instructions to implement: send control information carrying a value of at least one transmission parameter in at least one transmission parameter set. The control information adopts a value of a transmission parameter for a slot or a link on which the control information acts.

The embodiments of the present application further provide a non-transitory computer-readable storage medium. The computer-readable storage medium stores program instructions. When executed by a processor, the program instructions implement the above-mentioned parameter transmission method.

In the embodiments of the present application, transmission parameters for different resources (e.g., time domain resources and link resources) and with flexible configuration demands can be flexibly determined according to characteristics of the transmission parameter and a current application scenario, and transmission parameters of different time domain resources and link resources can be supported. This part of transmission parameters can have different configurations, thereby improving performance; and the other part of transmission parameters need the same configuration for different resources, thereby saving the signaling overhead and improving the compatibility.

Other aspects can be understood after the drawings and the detailed description are read and understood.

DETAILED DESCRIPTION

The embodiments of the present application will be described in detail in conjunction with the drawings, and it should be understood that the embodiments described hereinafter are intended to describe and explain the present application and not to limit the present application. The steps shown in the flowcharts among the drawings may be performed by a computer system such as a group of computers capable of executing instructions. Although logical sequences are shown in the flowcharts, the shown or described steps may be performed in sequences different from those described herein in some cases.

Parameters related to transmission in wireless communication can include various types, and includes following typical parameters:

a resource configuration parameter, such as a power resource, a time domain resource, a frequency domain resource, a beam resource, and an antenna resource;

a pilot configuration parameter, such as sequences, positions, densities, and ports of demodulation pilot and phase noise estimation pilot;

a precoder parameter, such as precoder time domain granularity, precoder frequency domain granularity and a precoder codeword set;

a rate matching parameter, such as a zero power demodulation reference signal (zero power DMRS), a zero power phase tracking reference signal (zero power PTRS), and a zero power resource element (zero power RE);

a modulation and coding parameter, such as a transport block (TB), a code block (CB), and block group (CBG) configuration;

a response parameter, such as acknowledgement/negative acknowledgement (ACK/NACK) feedback time, an ACK/NACK quantity, a correspondence between ACK/NACK and CBs or CBGs;

Numerology, such as the number or spacing of subcarriers, a point quantity of Fast Fourier Transform (FFT), a length of a cyclic prefix (CP), and a sampling frequency;

a waveform, such as circular prefix orthogonal frequency division multiplexing (CP-OFDM), discrete Fourier transform-spread-orthogonal frequency division multiplexing (DFT-S-OFDM) and single-carrier frequency-division multiple access (SC-FDMA); and transmission technology, such as diversity, an open-loop transmission, and a close-loop transmission, which can be implicitly determined via a precoder hypothesis between demodulation pilot and data.

In the related art, configuration efficiency of parameters related to transmission is low or compatibility of parameters related to transmission is poor during the DC, and configuration efficiency of control signaling is low or flexibility of the control signaling is poor during the SA. The present application can avoid the above-mentioned situation by configuring sending content of control information or configuring a sending strategy of the control information.

Figure 3:
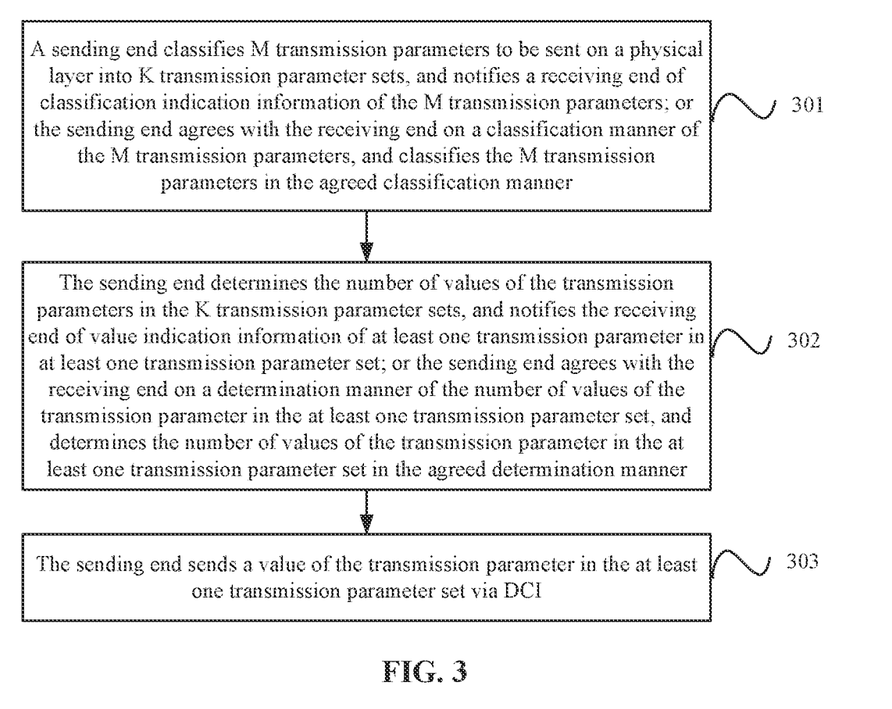
FIG. 3 is a flowchart of a transmission parameter configuration method according to an embodiment of the present application.

As shown in FIG. 3, the embodiments of the present application provide a transmission parameter configuration method. The method includes steps 301, 302 and 303.

In step 301, a sending end classifies M transmission parameters to be sent on a physical layer into K transmission parameter sets, and notifies a receiving end of classification indication information of the M transmission parameters; or the sending end agrees with the receiving end on a classification manner of the M transmission parameters, and classifies the M transmission parameters in the agreed classification manner. M and N are integers greater than or equal to 1.

The M transmission parameters are classified into the K transmission parameter sets, such as a transmission parameter set 1, . . . , and a transmission parameter set K.

The sending end and the receiving end can agree on a method or rule of classifying transmission parameters, and can also agree on a combination manner of the above-mentioned method or rule and an explicit indication.

The classification manner can be pre-agreed, and can also be determined by the sending end and then configured to the receiving end.

In an exemplary embodiment, when the sending end classifies the M transmission parameters to be sent on the physical layer into the K transmission parameter sets, the classification can be performed according to at least one of DCI configuration: a DCI format, a DCI structure, and DCI overhead.

In different DCI formats, the classification manner can be different. For example, some DCI formats support classification of a smaller K number of transmission parameters, and some DCI formats support classification of a larger K number of transmission parameters; and the classification manner supported by some DCI formats can be fixed, and the classification manner or numbers supported by some DCI formats can be configurable.

In different DCI structures, the classification manner can be different. For example, two-level DCI supports a larger K number of transmission parameters than one-level DCI.

In different DCI overhead, the classification manner can be different. For example, the maximum value of K is limited to the overhead.

In an exemplary embodiment, in different transmission modes, the classification manner can be different.

In an exemplary embodiment, the transmission parameters can be classified according to use of the transmission parameter. For example, the classification manner is different when the transmission parameter is used for DC and SA.

In an exemplary embodiment, the classification indication information of the transmission parameters includes at least one of: classification rule configuration information, value information of K, and transmission parameter type indication information contained in each of the transmission parameter sets.

In step 302, the sending end determines the number of values of the transmission parameters in the K transmission parameter sets, and notifies the receiving end of value indication information of at least one transmission parameter in at least one transmission parameter set; or the sending end agrees with the receiving end on a determination manner of the number of values of the transmission parameter in the at least one transmission parameter set, and determines the number of values of the transmission parameter in the at least one transmission parameter set in the agreed determination manner.

The transmission parameters in the same transmission parameter set have the same number of values. Numbers of values of the transmission parameters in the K transmission parameter sets are respectively $n1, n2, \ldots,$ and $nK$. $N1, n2, \ldots,$ and $nK$ are integers greater than or equal to 1.

$N1, n2, \ldots,$ and $nK$ can be agreed by the sending end and the receiving end or be determined by the sending end and then notified to the receiving end. For example, the sending end and the receiving end use the same agreed rule to determine values of $n1, n2, \ldots,$ and $nK$.

In an exemplary embodiment, at least one of the values of $n1, n2, \ldots,$ and $nK$ is greater than 1.

In an exemplary embodiment, part or all of the values of $n1, n2, \ldots,$ and $nK$ can be agreed by the sending end and the receiving end or be determined by the sending end and then configured to the receiving end.

In an exemplary embodiment, part or all of the values of $n1, n2, \ldots,$ and $nK$ can be determined according to at least one of overhead of the transmission parameter, DCI overhead, a transmission mode and a DCI type; or part or all of the values of $n1, n2, \ldots,$ and $nK$ can be determined according to the number of aggregated time-domain resource units; or part or all of the values of $n1, n2, \ldots,$ and $nK$ can be determined according to the number of transmission links.

In an exemplary embodiment, $n1, n2, \ldots,$ and $nK$ can be agreed to have only one value, and do not need to be indicated by the sending end (e.g., a base station).

In an exemplary embodiment, some of the values of $n1, n2, \ldots,$ and $nK$ may be determined by the sending end and need to be notified to the receiving end.

It is to be noted that when it is determined that a transmission parameter set may have multiple values, the values can be configured by the sending end or can be agreed by the sending end and the receiving end. For example, K is 2, n1 is fixed to be 1, and n2 is $1, 2, \ldots,$ or L. L is a natural number greater than 1, and the value of n2 can be configured by the sending end or determined by the sending end and the receiving end according to some rules such as the number of aggregated time domain resources and the number of links. For example, K is 2, n1 is 1, and n2 is 1 or 2; or K is 3, n1 is 1, n2 is 1 or L1, and n3 is 1 or L2; where L1 can be determined according to the number of transmission links, and L2 can be determined according to the number of aggregated time domain resources.

It is to be noted that after the classification in the agreed manner in step 301, in step 302, the number of values of the K transmission parameter sets need to be configured by the sending end.

That is, when the sending end agrees with the receiving end on the classification manner of the M transmission parameters, the sending end and the receiving end classify the M transmission parameters in the agreed classification manner, and the sending end determines the number of values of the transmission parameters in the K transmission parameter sets and notifies the receiving end of the value indication information of the transmission parameter in at least one transmission parameter set. When the number of values is determined in the agreed manner in step 302, in step 301, the classification needs to be performed by the sending end through configuration. That is, when the sending end agrees with the receiving end on the determination manner of the number of values of the transmission parameter in the at least one transmission parameter set, the sending end classifies the M transmission parameters to be sent on the physical layer into the K transmission parameter sets and notifies the receiving end of the classification indication information of the M transmission parameters, and the sending end and the receiving end determine the number of values of the transmission parameter in the at least one transmission parameter set in the agreed determination manner. In step 301, the sending end classifies the M transmission parameters to be sent on the physical layer into the K transmission parameter sets and sends the classification indication information of the M transmission parameters to the receiving end. In step 302, the sending end determines the number of values of the transmission parameters in the K transmission parameter sets and sends the value indication information of the transmission parameter in at least one transmission parameter set to the receiving end.

In step 303, the sending end sends a value of the transmission parameter in the at least one transmission parameter set via DCI.

In an exemplary embodiment, when the sending end sends values of the transmission parameters in L transmission parameter sets via the DCI, the sending end carries L values via the DCI, where L represents the number of types of transmission parameter sets and is an integer greater than 1 and less than or equal to K, and ni refers to the number of values of at least one transmission parameter in an i-th transmission parameter set.

Figure 4A:
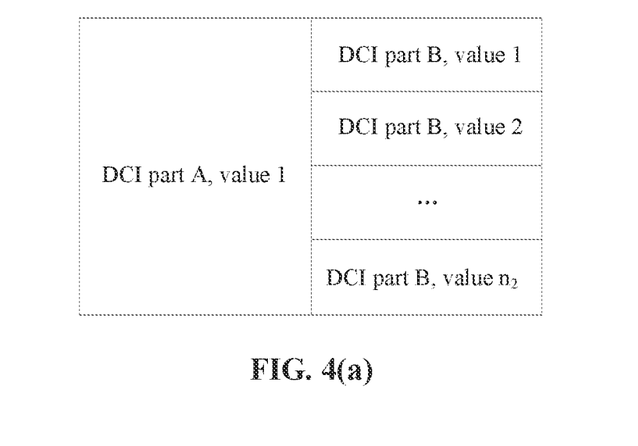
FIGS. 4A and 4B are structural diagrams of DCI according to an embodiment of the present application.
Figure 4B:
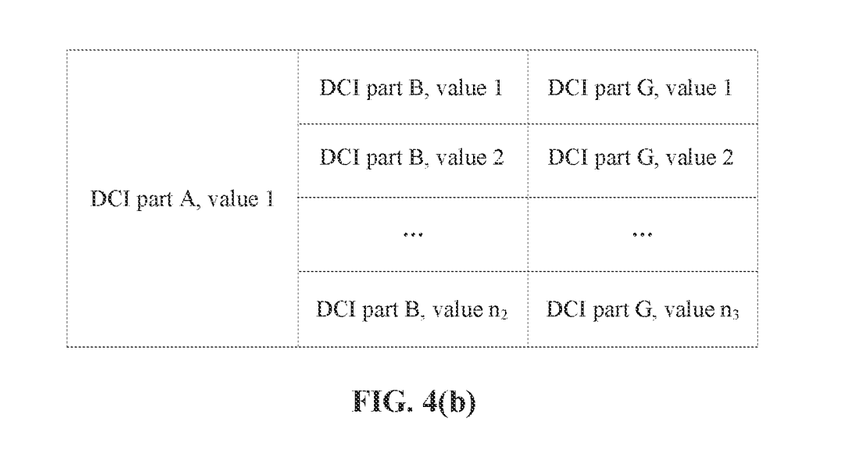
Figure 5:
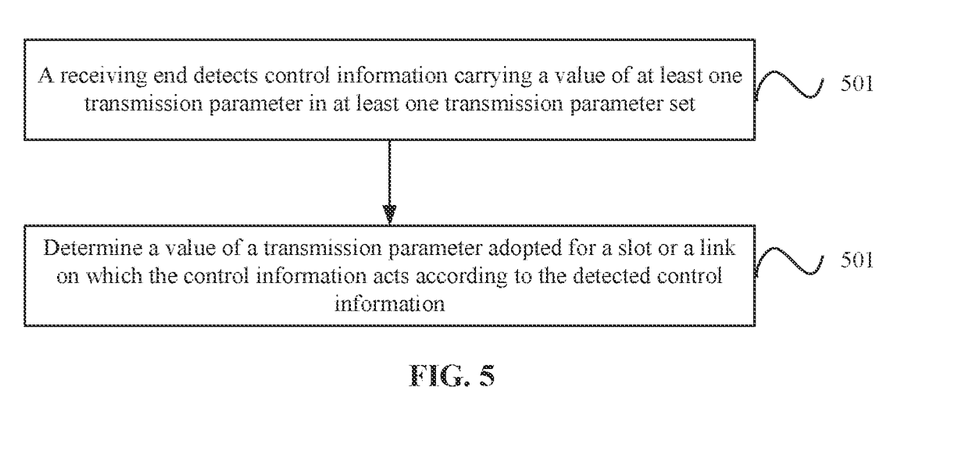
FIG. 5 is a flowchart of a transmission parameter determination method according to an embodiment of the present application.

If there is a transmission parameter set in which the transmission parameter only has a value in the DCI and at the same time, there is a transmission parameter set in which the transmission parameter has multiple values in the DCI, the value can be sent in a structure shown in FIG. 4A or FIG. 4B. For example, in FIG. 4A, K is 2, and n1 is 1; and in FIG. 4B, K is 3, and n1 is 1. It is to be noted that in FIG. 4A, a part A and a part B correspond to a transmission parameter set 1 and a transmission parameter set 2 respectively; and in FIG. 4B, a part A, a part B and a part G correspond to a transmission parameter set 1, a transmission parameter set 2 and a transmission parameter set 3 respectively. When K is greater than 3, which part corresponds to which transmission parameter set can be known in the similar way, and thus will not be repeated herein.

In the embodiments of the present application, transmission parameters for different resources (e.g., time domain resources and link resources) and with flexible configuration demands can be flexibly determined according to characteristics of the transmission parameter and a current application scenario, and can support different time domain resources and link resources. These transmission parameters can have different configurations, thereby improving performance; and other parts of transmission parameters need to use the same configuration for different resources, thereby saving DCI overhead and improving compatibility.

It is to be noted that the present application can also be applied to determine the number of values of a PMI according to the number of sub-bands; or to determine the number of values of a sending resource allocation parameter according to a situation of overlapping; or to determine the quantity of A/N or the quantity of retransmission indication information according to the number of CBGs.

In the embodiments of the present application, part of transmission parameters in the DCI can be configured with a value, and the other part of transmission parameters can be configured with multiple values. The sending end (e.g., a base station) can determine which transmission parameters are configured with multiple values via higher layer signaling (L2/L3) configuration, and notify the receiving end (e.g., a terminal) of these transmission parameters. The number of values of part of transmission parameters in the DCI can be changed, and can be determined according to the rule agreed by the sending end and the receiving end. For example, the number of values can be determined according to the number of aggregated slots and the number of links. However, the determination of the number of values is not limited in the present application, and the number of values may be determined according to other numbers, such as the number of CBGs, the number of PMIs of a sub-band, and the number of multiplexed users.

The embodiments of the present application further provide a transmission parameter determination method. The method includes steps 501 and 502.

In step 501, a receiving end detects control information carrying a value of at least one transmission parameter in at least one transmission parameter set.

In step 502, a value of a transmission parameter adopted for a slot or a link on which the control information acts is determined according to the detected control information.

In an exemplary embodiment, step 502 can include steps described below.

After detecting first control information acting on a first time window, the receiving end adopts, in the first time window, a value of a transmission parameter carried by the first control information.

After detecting second control information acting on a second time window, the receiving end adopts, in the first time window, a value of a transmission parameter carried by the second control information in the second time window; or adopts, in the second time window, a value of a transmission parameter determined by both the first control information and the second control information; and adopts, in the first time window and outside the second time window, the value of the transmission parameter carried by the first control information, wherein the second time window is located in the first time window.

Figure 6:
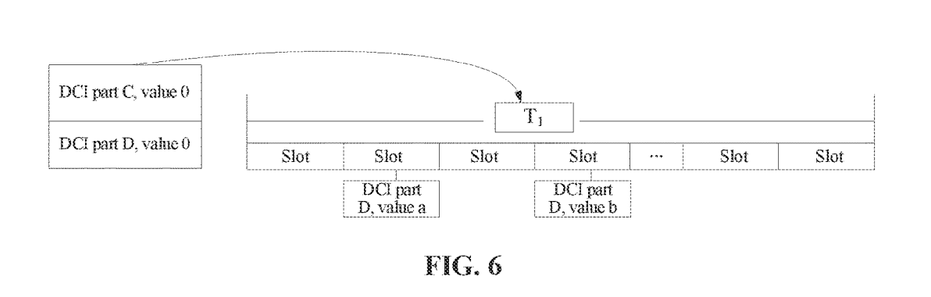
FIG. 6 is a schematic diagram of transmission of control information according to an embodiment of the present application.
Figure 7:
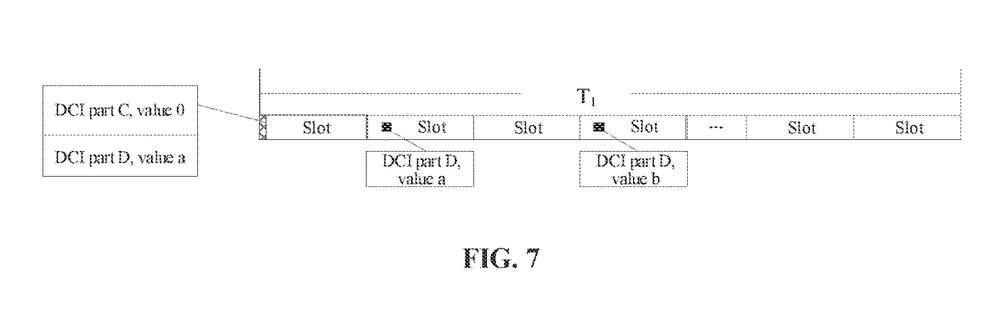
FIG. 7 is a schematic diagram of transmission of control information according to an embodiment of the present application.

The above steps are described via an example with reference to FIGS. 6 and 7.

In this exemplary embodiment, as shown in FIG. 6, the sending end can send first control information. The first control information carries a first DCI part value (e.g., DCI part C, value 0) and a second DCI part value (e.g., DCI part D, value 0).

The first DCI part value and the second DCI part value act on a time window T1. The length of the first time window (e.g., the time window T1) can be indicated in the first control information, or the time window T1 can also adopt a predefined manner. For example, start time is time when at least one of a third DCI part value (e.g., DCI part A, value 0) and a fourth DCI part value (e.g., DCI part B, value 0) is received, and end time is time when certain agreed signaling information is received.

The sending end can send second control information according to demands. The second control information carries a fifth DCI part value, a sixth DCI part value or a seventh DCI part value (e.g., DCI part D, value a, b or c). These values act on a second time window (e.g., a time window T2a, T2b or T2c).

The magnitude of T2a, T2b or T2c may be a slot, and the slot is a slot receiving DCI part B, value a, b or c, as shown in FIG. 7. In an embodiment, the magnitude of T2a, T2b or T2c may also be multiple slots. Time domain resources contained in T2a, T2b or T2c can be pre-agreed by the sending end and the receiving end or configured by the sending end.

It is to be noted that whether the sending end sends the DCI part D, value a, b or c can be determined by manufacturers, which is not limited in the present application.

A sending area of the DCI part D, value a, b or c is not necessarily the same as a sending area of the DCI part D, value 0. If the DCI part C has resource allocation indication information, control information corresponding to the DCI part D, value a, b or c can be sent in a resource area indicated by the DCI part C. This area can be located in a resource area in which a downlink data channel is located.

In this exemplary embodiment, the receiving end detects the control signaling. In the time window T1, the value of the DCI part C is fixed and is the value 0. The value of the DCI part D may be changed. If the receiving end can detect the DCI part D, value a, b or c, in the corresponding time window, the value of the DCI part D is the value a, b or c, and in other slots in the time window T1, its value is the value 0.

In this example, the value of the DCI part D is changed according to demands. If necessary, the sending end (e.g., a base station) sends a new value (e.g., the value a, b or c); and if not necessary, a pre-configured default value (e.g., the value 0) is adopted.

In this exemplary embodiment, a case in which the value a, b or c replaces the value 0 is described. However, the present application is not limited to this. In other embodiments, a following manner may also be adopted.

If the receiving end can detect the DCI part D, value a, b or c, in the corresponding time window, the value of the DCI part D can be determined according to (value 0+value a), (value 0+value b) or (value 0+value c), and in other slots in the time window, its value is the value 0. In practical applications, adopting which manner may depend on the type of the transmission parameter.

In another exemplary embodiment, step 502 can include a step described below.

Values of transmission parameters adopted for a first link and a second link are determined according to third control information of a first size and fourth control information of a second size. The third control information of the first size is blindly detected according to a first period, and the fourth control information of the second size is blindly detected according to a second period, where the first size is greater than or equal to the second size, and the first period is greater than or equal to the second period.

Figure 8:
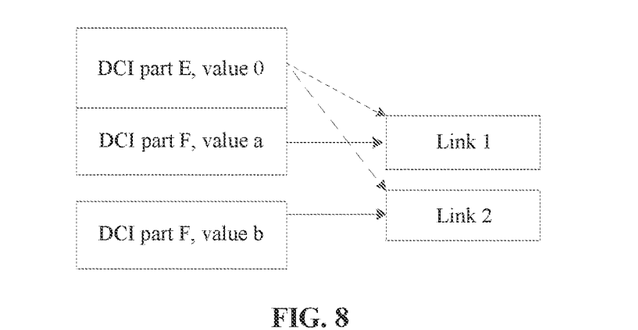
FIG. 8 is a schematic diagram of transmission of control information according to an embodiment of the present application.

The above step is described via an example with reference to FIG. 8.

As shown in FIG. 8, in this exemplary embodiment, the receiving end (e.g., a terminal) can blindly detect DCI 1 (big size) formed by DCI part E, value 0 and DCI part F, value a, and acquire transmission parameters of a link 1 according to the DCI 1; and the terminal can also detect DCI 2 (small size) formed by DCI part F, value b, and acquire transmission parameters of a link 2 according to the DCI 1 and the DCI 2.

Optionally, the terminal can blindly detect DCI 1 (big size) formed by DCI part E, value 0 and DCI part F, value b, and acquire transmission parameters of a link 2 according to the DCI 1; and the terminal can also detect DCI 2 (small size) formed by DCI part F, value a, and acquire transmission parameters of a link 1 according to the DCI 1 and the DCI 2.

Optionally, the terminal can perform blind detection according to DCI 1 (big size) formed by DCI part E, value 0 and DCI part F, value a and value b, and acquire transmission parameters of a link 1 and a link 2; and the terminal can also perform blind detection according to DCI 2 (small size) formed by DCI part E, value 0 and DCI part F, value a, and acquire transmission parameters of a link 1 or a link 2.

It is to be noted in the drawings of the present application, the part A and the part B may be or may not be the same as the part C and the part D, or the part A and the part B may be or may not be the same as the part E and the part F. However, the present application is not limited to this.

Figure 9:
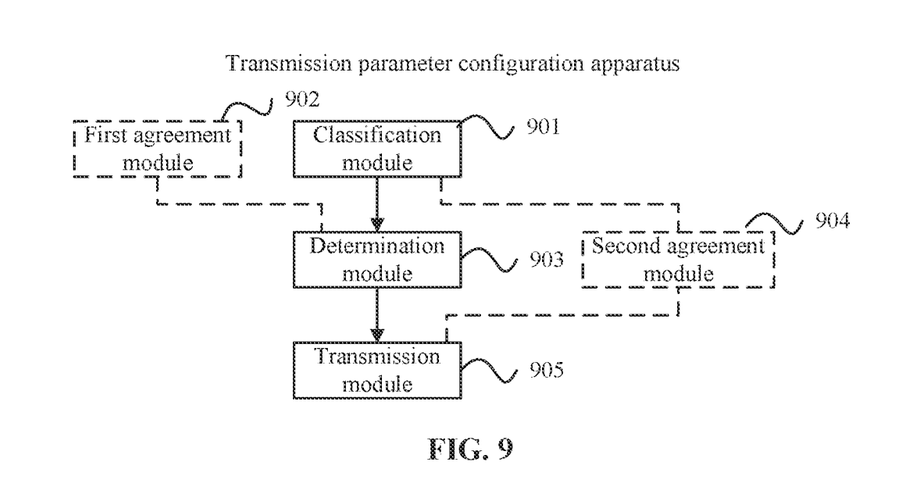
FIG. 9 is a schematic diagram of a transmission parameter configuration apparatus according to an embodiment of the present application.

The embodiments of the present application further provide a transmission parameter configuration apparatus. As shown in FIG. 9, the apparatus includes a classification module 901 or a first agreement module 902, a determination module 903 or a second agreement module 904, and a transmission module 905.

The classification module 901 is configured to classify M transmission parameters to be sent on a physical layer into K transmission parameter sets, and notify a receiving end of classification indication information of the M transmission parameters. The first agreement module 902 is configured to agree with the receiving end on a classification manner of the M transmission parameters, and classify the M transmission parameters in the agreed classification manner. M and K are integers greater than 1.

The determination module 903 is configured to determine the number of values of the transmission parameters in the K transmission parameter sets, and notify the receiving end of value indication information of at least one transmission parameter in at least one transmission parameter set. The second agreement module 904 is configured to agree with the receiving end on a determination manner of the number of values of the transmission parameter in the at least one transmission parameter set, and determine the number of values of the transmission parameter in the at least one transmission parameter set in the agreed determination manner.

The transmission module 905 is configured to send a value of the transmission parameter in the at least one transmission parameter set via DCI.

In an exemplary embodiment, the classification module 901 can be configured to classify the M transmission parameters to be sent on the physical layer into the K transmission parameter sets in at least one of following manners:

classifying the M transmission parameters to be sent on the physical layer into the K transmission parameter sets according to a DCI format; classifying the M transmission parameters to be sent on the physical layer into the K transmission parameter sets according to a DCI structure; classifying the M transmission parameters to be sent on the physical layer into the K transmission parameter sets according to DCI overhead; classifying the M transmission parameters to be sent on the physical layer into the K transmission parameter sets according to a transmission mode; or classifying the M transmission parameters to be sent on the physical layer into the K transmission parameter sets according to use of the M transmission parameters.

In an exemplary embodiment, the classification indication information includes at least one of: classification rule configuration information, value information of K, and transmission parameter type indication information contained in each of the transmission parameter sets.

In an exemplary embodiment, the transmission parameters in the same transmission parameter set have the same number of values, and numbers of values of the transmission parameters in the K transmission parameter sets are respectively n1, n2, . . . , and nK, where n1, n2, . . . , and nK are integers greater than or equal to 1.

In an exemplary embodiment, the determination module 903 is configured to determine the number of values of the transmission parameters in the K transmission parameter sets in at least one of following manners:

determining the number of values of the transmission parameter in the at least one transmission parameter set according to at least one of overhead of the transmission parameter, DCI overhead, a transmission mode or a DCI type;

determining the number of values of the transmission parameter in the at least one transmission parameter set according to the number of aggregated time domain resource units; or determining the number of values of the transmission parameter in the at least one transmission parameter set according to the number of transmission links.

In an exemplary embodiment, the second agreement module 904 can be configured to agree with the receiving end on the determination manner of the number of values of the transmission parameter in the at least one transmission parameter set in at least one of following manners:

agreeing to determine the number of values of the transmission parameter in the at least one transmission parameter set according to at least one of overhead of the transmission parameter, DCI overhead, a transmission mode or a DCI type;

agreeing to determine the number of values of the transmission parameter in the at least one transmission parameter set according to the number of aggregated time domain resource units;

or agreeing to determine the number of values of the transmission parameter in the at least one transmission parameter set according to the number of transmission links.

For a description related to the transmission parameter configuration apparatus in this embodiment, reference may be made to the description of the above-mentioned transmission parameter configuration method, which is not repeated herein.

Figure 10:
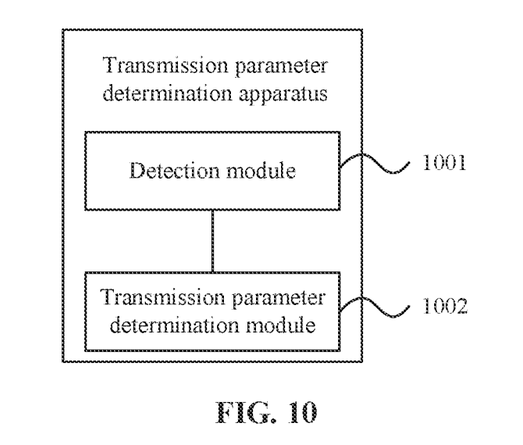
FIG. 10 is a schematic diagram of a transmission parameter determination apparatus according to an embodiment of the present application.

The embodiments of the present application further provide a transmission parameter determination apparatus. As shown in FIG. 10, the apparatus includes a detection module 1001 and a transmission parameter determination module 1002.

The detection module 1001 is configured to detect control information carrying a value of at least one transmission parameter in at least one transmission parameter set.

The transmission parameter determination module 1002 is configured to determine a value of a transmission parameter adopted for a slot or a link on which the control information acts according to the detected control information.

In an exemplary embodiment, the transmission parameter determination module 1002 can be configured to determine the value of the transmission parameter adopted for the slot or the link on which the control information acts according to the detected control information in one of following manners:

after detecting first control information acting on a first time window, adopting, by the detection module 1001, in the first time window, a value of a transmission parameter carried by the first control information, and in the first time window, after detecting second control information acting on a second time window, adopting, by the detection module 1001, in the second time window, a value of a transmission parameter carried by the second control information; or adopting, in the second time window, a value of a transmission parameter determined by both the first control information and the second control information, and adopting, in the first time window and outside the second time window, the value of the transmission parameter carried by the first control information, where the second time window is located in the first time window; or determining values of transmission parameters adopted for a first link and a second link according to third control information of a first size and fourth control information of a second size, where the third control information of the first size is blindly detected according to a first period, and the fourth control information of the second size is blindly detected according to a second period, where the first size is greater than or equal to the second size, and the first period is greater than or equal to the second period.

For a description related to the transmission parameter determination apparatus in this embodiment, reference may be made to the description of the above-mentioned transmission parameter determination method, which is not repeated herein.

In addition, the embodiments of the present application further provide a transmission parameter configuration apparatus (e.g., a base station). The apparatus includes a memory and a processor. The memory is configured to store transmission parameter configuration programs executable on the processor. The transmission parameter configuration programs, when executed by the processor, implement the above-mentioned transmission parameter configuration method.

In addition, the embodiments of the present application further provide a transmission parameter determination apparatus (e.g., a terminal). The apparatus includes a memory and a processor. The memory is configured to store transmission parameter determination programs executable on the processor. The transmission parameter determination programs, when executed by the processor, implement the above-mentioned transmission parameter determination method.

In addition, the embodiments of the present application further provide a machine-readable medium. The machine-readable medium is configured to store transmission parameter configuration programs which, when executed by a processor, implement the above-mentioned transmission parameter configuration method.

In addition, the embodiments of the present application further provide a machine-readable medium. The machine-readable medium is configured to store transmission parameter determination programs which, when executed by a processor, implement the above-mentioned transmission parameter determination method.

It should be understood by those skilled in the art that functional modules/units in all or part of the steps of the method, the system and the apparatus disclosed above may be implemented as software, firmware, hardware and appropriate combinations thereof. In the hardware implementation, the division of functional modules/units mentioned in the above description may not correspond to the division of physical components. For example, one physical component may have multiple functions, or one function or step may be executed jointly by one or more physical components. Some or all components may be implemented as software executed by processors such as digital signal processors or microcontrollers, hardware, or integrated circuits such as application specific integrated circuits. Such software may be distributed on a machine-readable medium (such as a computer-readable medium). The computer-readable medium may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital versatile disc (DVD) or other optical disc storage, a magnetic cassette, a magnetic tape, disk storage or other magnetic storage apparatus, or any other medium used to store the desired information and accessible by a computer. In addition, as is known to those skilled in the art, the communication medium generally includes computer-readable instructions, data structures, program modules or other data in modulated data signals such as carriers or other transmission mechanisms, and may include any information delivery medium.

What is claimed is:

1. A parameter transmission method, comprising:
    sending, by a sending end, control information carrying a value of at least one transmission parameter in at least one transmission parameter set;
    wherein the control information adopts a value of a transmission parameter for a slot or a link on which the control information acts;
    wherein sending, by the sending end, the control information carrying a value of at least one transmission parameter in at least one transmission parameter set comprises:
    sending, by the sending end, first control information, wherein the first control information acts on a first time window and the control information adopts, in the first time window, a value of a transmission parameter carried by the first control information; and
    sending, by the sending end, second control information, wherein the second control information acts on a second time window, and the control information adopt, in the first time window, a value of a transmission parameter carried by the first control information; or control information adopt, in the second time window, a value of a transmission parameter determined by both the first control information and the second control information; and control information adopt, in the first time window and outside the second time window, the value of the transmission parameter carried by the first control information, wherein the second time window is located in the first time window.

2. The method of claim 1, wherein the first control information carries a first DCI part value and a second DCI part value, wherein the first DCI part value and the second DCI part value both act on the first time window.

3. The method of claim 1, wherein a length of the first time window is indicated in the first control information, or the length of the first time window is indicated in a predefined manner.

4. The method of claim 1, start time of the first time window is time when at least one of a third DCI part value or a fourth DCI part value is received, and end time of the first time window is time when agreed signaling information is received.

5. The method of claim 1, wherein the second control information carries a fifth DCI part value, a sixth DCI part value or a seventh DCI part value, wherein the fifth DCI part value, the sixth DCI part value or the seventh DCI part value acts on the second time window.

6. The method of claim 1, the second time window has a slot or a plurality of slots.

7. The method of claim 1, wherein sending, by the sending end, the control information carrying a value of at least one transmission parameter in at least one transmission parameter set further comprises:
   sending, by the sending end, third control information and fourth control information, wherein the third control information has a first size and the fourth control information has a second size, wherein the first size is greater than or equal to the second size.

8. A parameter transmission apparatus, comprising:
   a processor and a memory storing program instructions, wherein the processor executes the program instructions to implement:
   sending control information carrying a value of at least one transmission parameter in at least one transmission parameter set;
   wherein the control information adopts a value of a transmission parameter for a slot or a link on which the control information acts;
   wherein the processor executes the program instructions to implement:
   sending first control information, wherein the first control information acts on a first time window and the control information adopts, in the first time window, a value of a transmission parameter carried by the first control information; and
   sending second control information, wherein the second control information acts on a second time window, and the control information adopt, in the first time window, a value of a transmission parameter carried by the first control information; or control information adopt, in the second time window, a value of a transmission parameter determined by both the first control information and the second control information; and control information adopt, in the first time window and outside the second time window, the value of the transmission parameter carried by the first control information, wherein the second time window is located in the first time window.

9. The apparatus of claim 8, wherein the first control information carries a first DCI part value and a second DCI part value, wherein the first DCI part value and the second DCI part value both act on the first time window.

10. The apparatus of claim 8, wherein a length of the first time window is indicated in the first control information, or the length of the first time window is indicated in a predefined manner.

11. The apparatus of claim 8, start time of the first time window is time when at least one of a third DCI part value or a fourth DCI part value is received, and end time of the first time window is time when agreed signaling information is received.

12. The apparatus of claim 8, wherein the second control information carries a fifth DCI part value, a sixth DCI part value or a seventh DCI part value, wherein the fifth DCI part value, the sixth DCI part value or the seventh DCI part value acts on the second time window.

13. The apparatus of claim 8, the second time window has a slot or a plurality of slots.

14. The apparatus of claim 8, wherein the processor executes the program instructions to implement:
   sending third control information and fourth control information, wherein the third control information has a first size and the fourth control information has a second size, wherein the first size is greater than or equal to the second size.

15. A non-transitory computer-readable storage medium storing program instructions, which, when executed by a processor, implement the parameter transmission method according to claim 1.

* * * * *